(12) United States Patent
Kim et al.

(10) Patent No.: US 8,416,507 B2
(45) Date of Patent: Apr. 9, 2013

(54) ZOOM LENS ASSEMBLY

(75) Inventors: Seung-yong Kim, Goyang-si (KR); Seon-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 12/942,273

(22) Filed: Nov. 9, 2010

(65) Prior Publication Data

US 2011/0116175 A1    May 19, 2011

(30) Foreign Application Priority Data

Nov. 17, 2009 (KR) .................. 10-2009-0110912

(51) Int. Cl.
*G02B 15/14* (2006.01)
*G02B 7/02* (2006.01)

(52) U.S. Cl.
USPC .................. 359/700; 359/694; 359/822

(58) Field of Classification Search .......... 359/700, 359/691, 694, 813–814, 821–826
See application file for complete search history.

(56) References Cited

U.S. PATENT DOCUMENTS

| 2002/0141075 A1* | 10/2002 | Nagae ............... 359/699 |
| 2005/0134976 A1* | 6/2005 | Yano ................ 359/824 |
| 2009/0161003 A1* | 6/2009 | Takahashi et al. ...... 348/360 |

FOREIGN PATENT DOCUMENTS

JP        08-179190 A    7/1996

* cited by examiner

*Primary Examiner* — Dawayne A Pinkney
(74) *Attorney, Agent, or Firm* — Drinker Biddle & Reath LLP

(57) ABSTRACT

A zoom lens assembly includes a first barrel including a first lens group; a second barrel including a second lens group that is aligned with respect to an optical axis of the first lens group, the second barrel disposed in front of the first lens group so as to be position-adjustable along the optical axis with respect to the first barrel; and a first ray shielding plate disposed in front of the first barrel and between the first barrel and the second barrel, and whose position is varied to be close to a center of the optical axis or to be distant from the center of the optical axis so as to block a portion of incident light that enters into the first barrel according to relative positions of the first barrel and the second barrel.

10 Claims, 6 Drawing Sheets

ZOOM LENS ASSEMBLY

CROSS-REFERENCE TO RELATED PATENT APPLICATION

This application claims the priority benefit of Korean Patent Application No. 10-2009-0110912, filed on Nov. 17, 2009, in the Korean Intellectual Property Office, the disclosure of which is incorporated herein in its entirety by reference.

BACKGROUND

1. Field of the Invention

Embodiments relate to a zoom lens assembly, and more particularly, to a zoom lens assembly in which a position of a plate for blocking a harmful ray is varied to be close to a center of an optical axis or to be distant from the center of the optical axis when positions of lens groups are adjusted to implement a zoom function.

2. Description of the Related Art

A lens group mounted in a camera focuses external light of an object onto a charged coupled device (CCD) or a surface of a film so that the camera may capture an image. In order to obtain a satisfactory image, it is necessary to block harmful rays that enter into a barrel of the camera. The harmful rays besides rays that form the image are reflected by an inner surface of the barrel, and are incident on the CCD or the film surface, thus lowering image quality.

A shielding plate for blocking an inflow of the harmful rays is mounted at an edge of the lens group. However, a conventional shielding plate is manufactured to have a fixed shape such that the conventional shielding plate has a problem in that performing a function to block the harmful ray is limited.

For example, a plurality of lens groups each having a zoom function are disposed to be adjustable with respect to each other. However, in general, the conventional shielding plate is designed to have a shape suitable for a plurality of lens groups at a wide angle position, and thus, when positions of the plurality of lens groups are adjusted to a telephoto angle position, the conventional shielding plate cannot effectively prevent harmful rays from entering into a barrel.

SUMMARY

Embodiments include a zoom lens assembly that effectively blocks harmful rays that enter into a barrel.

Embodiments also include a zoom lens assembly in which a shape of a mask is adjusted accordingly when relative positions of lenses are adjusted for a zoom function, whereby harmful rays are effectively blocked.

Embodiments also include a zoom lens assembly having a compact structure by minimizing a space in the zoom lens assembly for installation of equipment for blocking harmful rays.

Embodiments also include a zoom lens assembly that operates in conjunction with variations of relative positions of barrels so that a position of a shielding plate for blocking harmful rays is automatically varied in consideration of a relative position of a lens group.

According to an embodiment, a zoom lens assembly includes a first barrel including a first lens group; a second barrel including a second lens group that is aligned with respect to an optical axis of the first lens group, the second lens barrel disposed in front of the first lens group so as to be position-adjustable along the optical axis with respect to the first barrel; and a first ray shielding plate disposed in front of the first barrel and between the first barrel and the second barrel, and whose position is varied to be close to a center of the optical axis or to be distant from the center of the optical axis so as to block a portion of incident light that enters into the first barrel according to relative positions of the first barrel and the second barrel.

The zoom lens assembly may further include a rotating plate including a through hole corresponding to the optical axis, the rotating plate disposed in front of the first barrel so as to rotate around the optical axis, the rotating plate also including a long hole coupled with a first coupling protrusion of the first ray shielding plate so as to transform rotational movement of the rotating plate into linear movement of the first ray shielding plate. The zoom lens assembly may also include a guiding cylinder having a cylindrical shape and surrounding the first barrel, the guiding cylinder including: a barrel guiding groove coupled with a guiding protrusion externally protruding from the first barrel, the barrel guiding groove guiding movement of the guiding protrusion, and a cam guiding groove coupled with a cam externally protruding from the rotating plate, the cam guiding groove guiding rotation of the rotating plate.

The barrel guiding groove may extend in a longitudinal direction of the guiding cylinder.

The cam guiding groove may be formed as a curve extending in a circular direction of the guiding cylinder.

The zoom lens assembly may further include an elastic member disposed between the rotating plate and a front surface of the first barrel and that elastically supports the rotating plate with respect to the first barrel, wherein a rear surface of the second barrel presses a second movement guiding plate in a direction toward the first barrel.

The zoom lens assembly may further include a first movement guiding plate disposed between the rotating plate and the first ray shielding plate so as to guide the linear movement of the first ray shielding plate.

The first movement guiding plate may include a groove that linearly extends, and the first ray shielding plate may include a protrusion that is coupled with the groove of the first movement guiding plate.

The zoom lens assembly may further include a second ray shielding plate including a long hole to which a second coupling protrusion protruding from a front surface of the first ray shielding plate is inserted, the second ray shielding plate disposed in front of the first ray shielding plate, wherein the second movement guiding plate is disposed in front of the second ray shielding plate so as to guide linear movement of the second ray shielding plate.

The second movement guiding plate may include a groove that linearly extends, and the second ray shielding plate may include a protrusion that is coupled with the groove of the second movement guiding plate.

The groove of the second movement guiding plate may be extended in a direction crossing a direction in which the groove of the first movement guiding plate is extended.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, a configuration and operation of a zoom lens assembly according to one or more embodiments will be described in detail with reference to the attached drawings.

Figure 1:
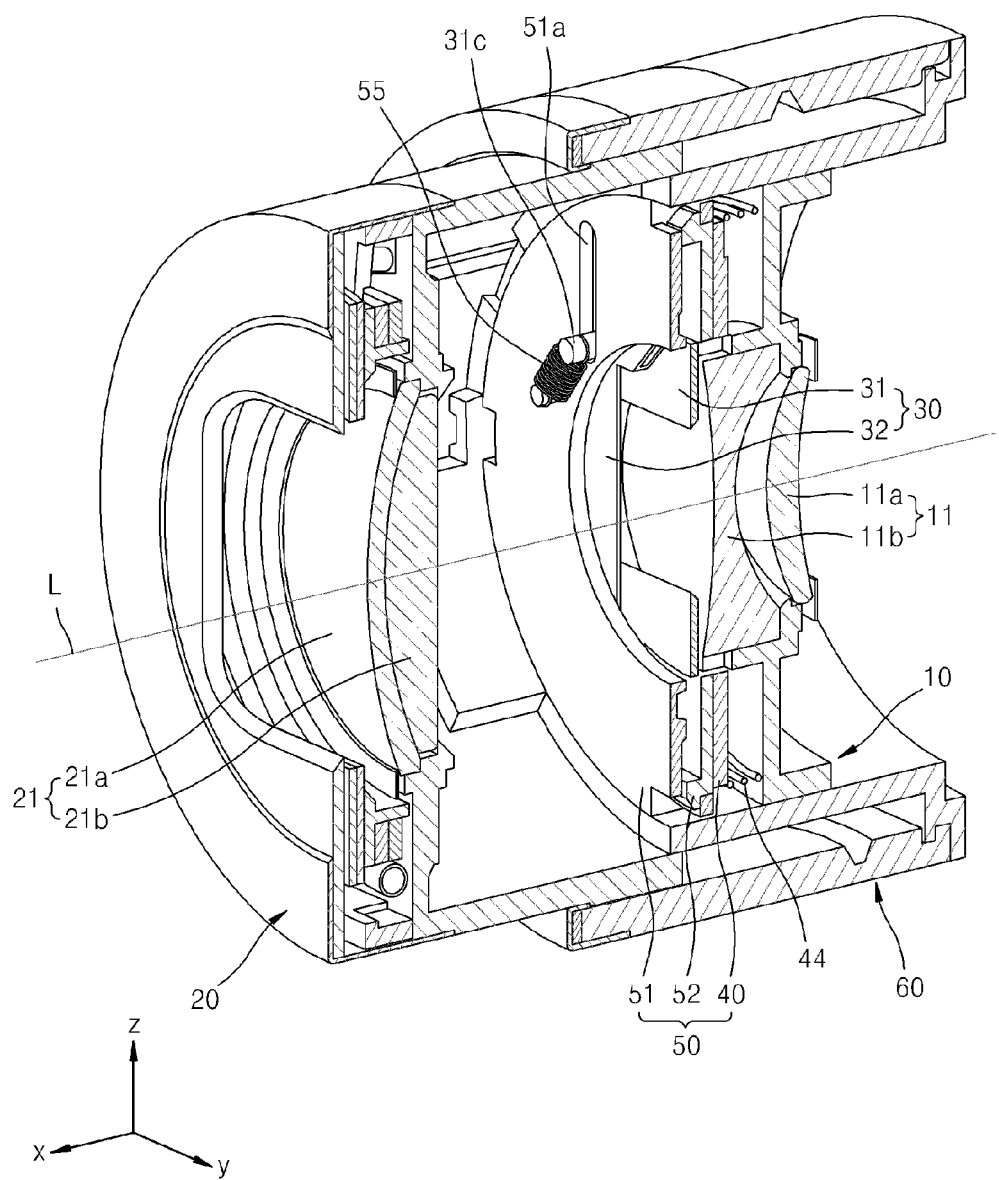
FIG. 1 is a cross-sectional perspective view of a zoom lens assembly, according to an embodiment.
Figure 2:
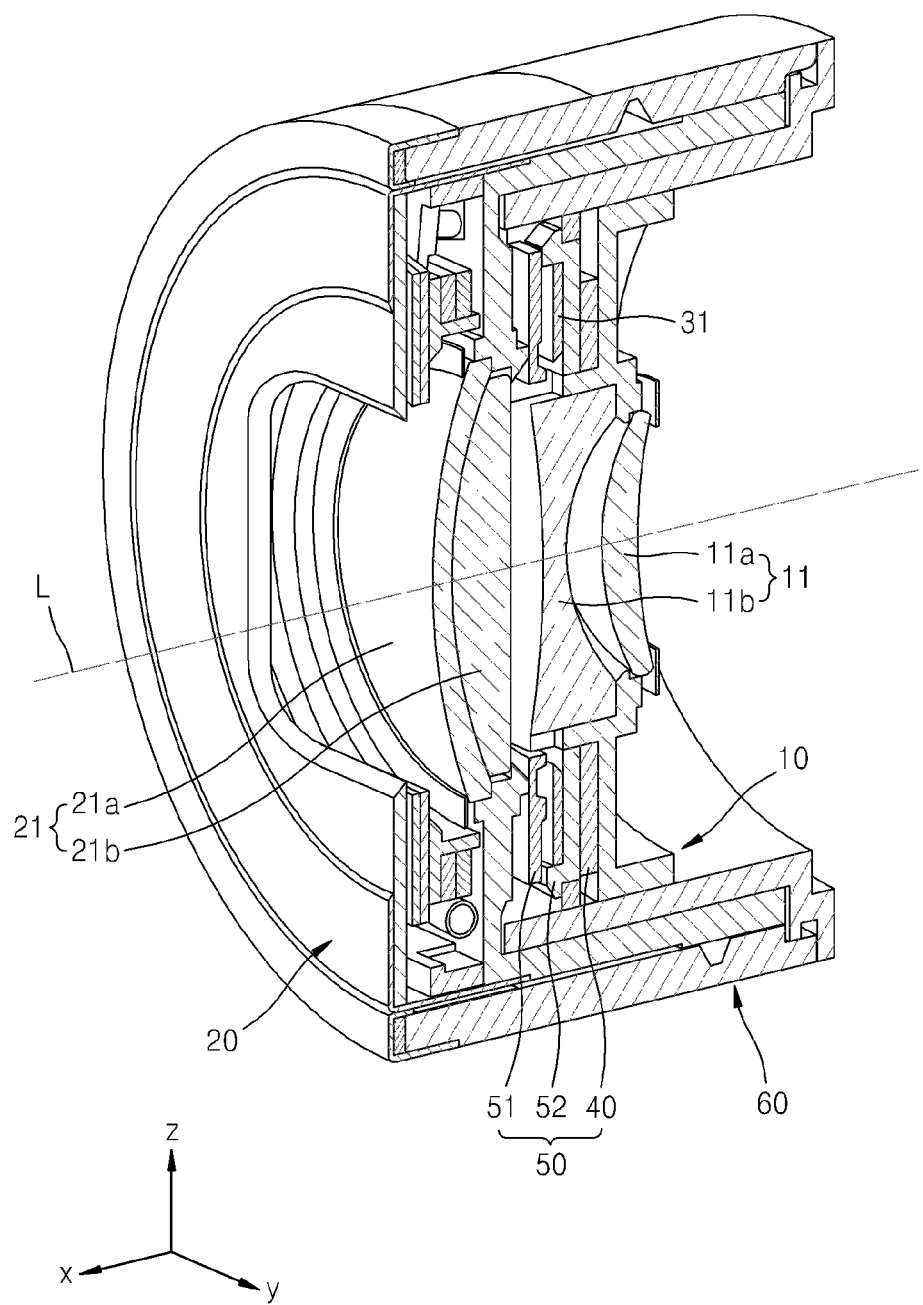
FIG. 2 is a cross-sectional perspective view of the zoom lens assembly of FIG. 1 when the zoom lens assembly is not operating and thus is in a housed state.
Figure 3:
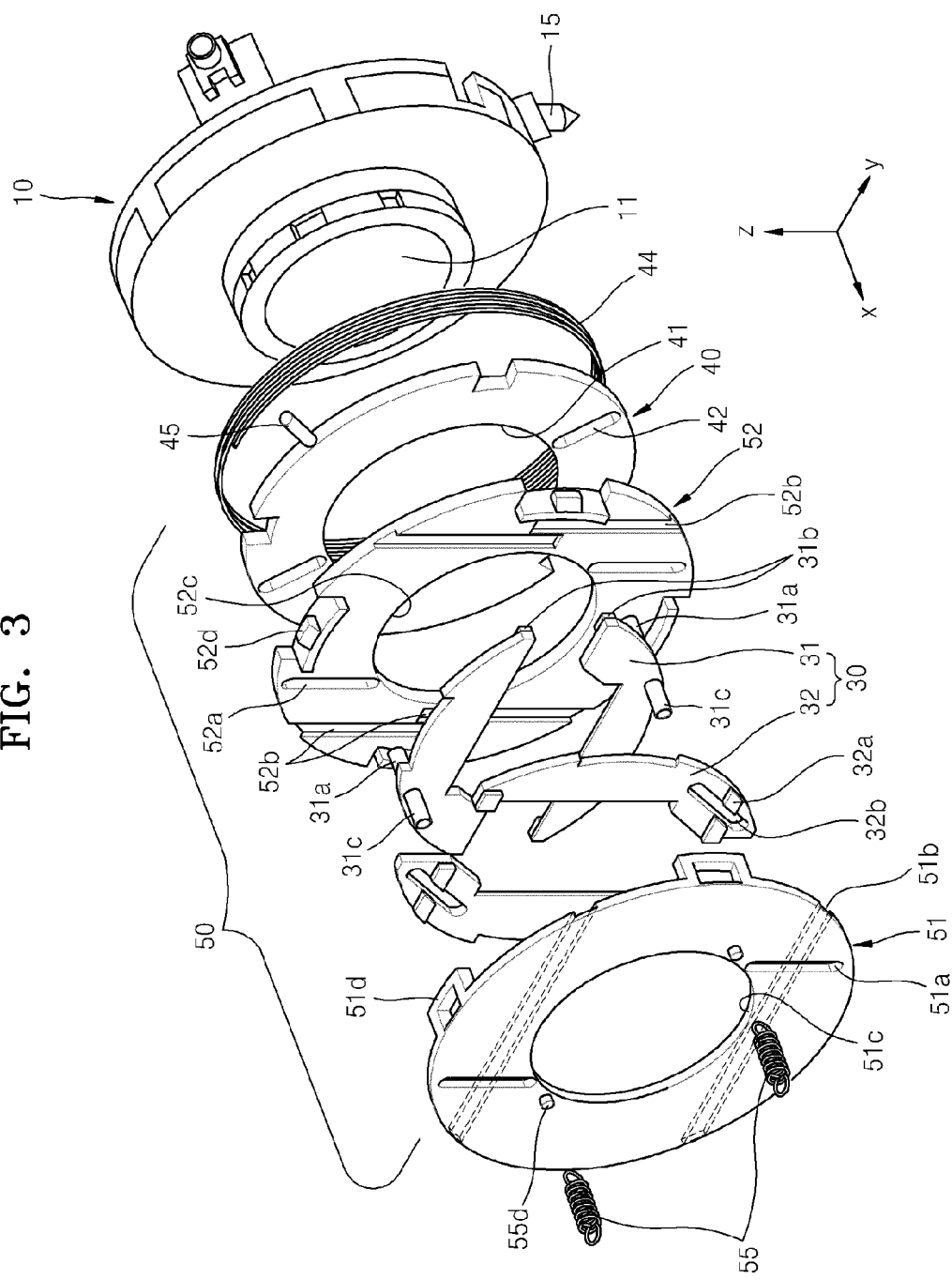
FIG. 3 is an exploded perspective view of some components in the zoom lens assembly of FIG. 1.

FIG. 1 is a cross-sectional perspective view of a zoom lens assembly, according to an embodiment. FIG. 2 is a cross-sectional perspective view of the zoom lens assembly of FIG. 1 when the zoom lens assembly is in a housed state, that is, when the zoom lens assembly is not operating. FIG. 3 is an exploded perspective view of some components in the zoom lens assembly of FIG. 1.

The zoom lens assembly according to the present embodiment of FIG. 1 includes a first barrel 10, a second barrel 20 disposed in front of the first barrel 10, and ray shielding plates 30 disposed between the first barrel 10 and the second barrel 20.

The first barrel 10 includes a first lens group 11 including a plurality of lenses 11a and 11b that are aligned along an optical axis L. The second barrel 20 includes a second lens group 21 including a plurality of lenses 21a and 21b that are aligned with respect to the optical axis L. Since the second barrel 20 is disposed in front of the first barrel 10 so as to be movable along the optical axis L, the second barrel 20 is position-adjustable with respect to the first barrel 10.

In this manner, the first barrel 10 and the second barrel 20 are position-adjustable with respect to each other so that it is possible to execute a zoom function for performing a photographing operation by varying a focal length.

The ray shielding plates 30 are disposed between the first barrel 10 and the second barrel 20. The ray shielding plates 30 include a first ray shielding plate 31 that is movable on an axis vertically crossing the optical axis L (Z-axis in FIG. 1), and a second ray shielding plate 32 that is movable on another axis horizontally crossing the optical axis L (Y-axis in FIG. 1). Positions of the first and second ray shielding plates 31 and 32 are varied to be close to the optical axis L or to be distant from the optical axis L according to relative positions of the first barrel 10 and the second barrel 20. Thus, the ray shielding plates 30 may function to block a portion of rays that may enter into the first barrel 10.

To be more specific, when the zoom lens assembly is adjusted to a wide angle position, a relative distance between the first barrel 10 and the second barrel 20 becomes small and the positions of the first and second ray shielding plates 31 and 32 are adjusted to be distant from the optical axis L. Also, when the zoom lens assembly is adjusted to a telephoto angle position, the relative distance between the first barrel 10 and the second barrel 20 becomes large and the positions of the first and second ray shielding plates 31 and 32 are adjusted to be close to the optical axis L.

The first and second ray shielding plates 31 and 32 whose positions are adjusted to be close to or to be distant from the center of the optical axis L may be disposed to be moved by a shielding assembly 50. Referring to FIG. 3, the shielding assembly 50 includes a rotating plate 40 that delivers a force to move the ray shielding plates 30, a first movement guiding plate 52 disposed in front of the rotating plate 40 so as to guide movement of the first ray shielding plate 31, the first ray shielding plate 31 disposed in front of the rotating plate 40, the second ray shielding plate 32 disposed in front of the first ray shielding plate 31, and a second movement guiding plate 51 disposed in front of the second ray shielding plate 32.

Figure 4:
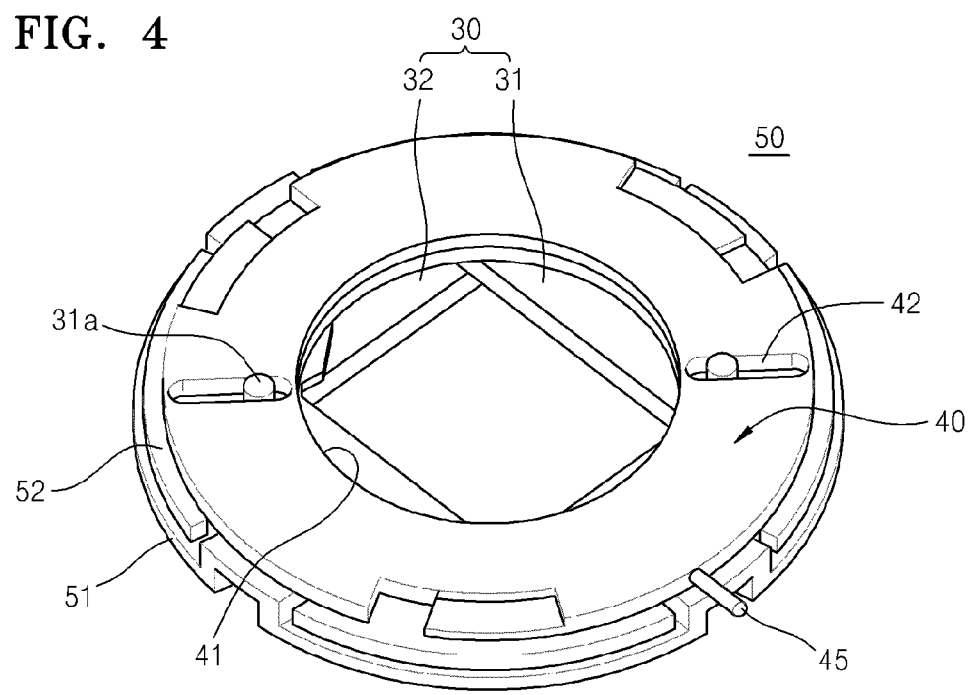
FIG. 4 is a perspective view of a shielding assembly included in the zoom lens assembly of FIG. 1.
Figure 5:
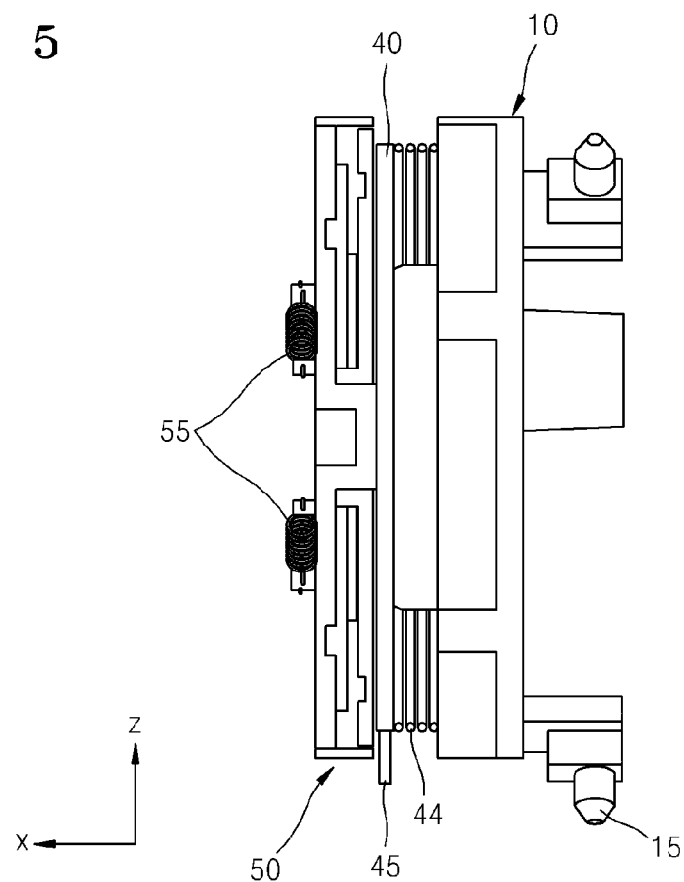
FIG. 5 is a side view illustrating a coupled state between a first barrel and the shielding assembly included in the zoom lens assembly of FIG. 1.
Figure 6:
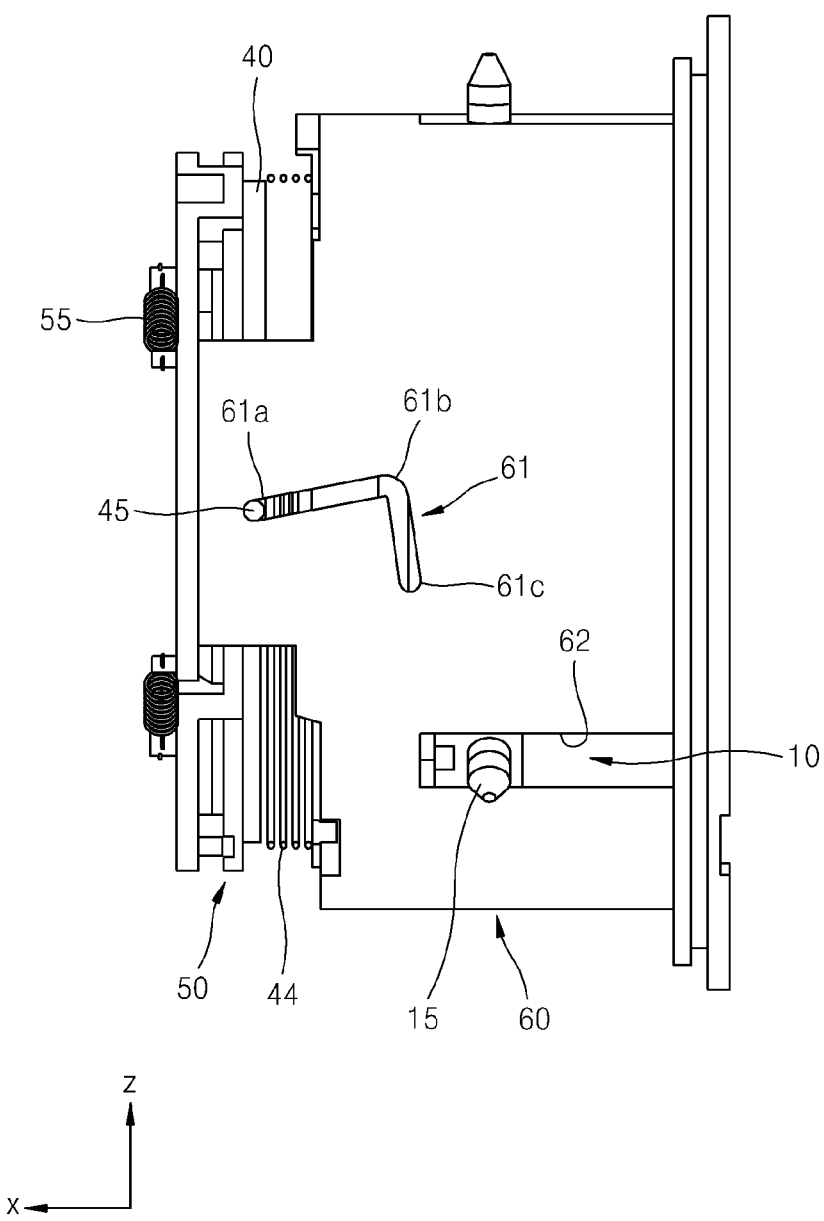
FIG. 6 is a side view of a guiding cylinder coupled to the first barrel and the shielding assembly of FIG. 3.

FIG. 4 is a perspective view of the shielding assembly 50 included in the zoom lens assembly of FIG. 1. FIG. 5 is a side view illustrating a coupled state between the first barrel 10 and the shielding assembly 50 included in the zoom lens assembly of FIG. 1. FIG. 6 is a side view of a guiding cylinder 60 coupled to the first barrel 10 and the shielding assembly 50 of FIG. 3.

As illustrated in FIG. 3, the shielding assembly 50 includes various components and is disposed in front of the first barrel 10.

As illustrated in FIG. 6, the shielding assembly 50 and the first barrel 10 are disposed in the guiding cylinder 60. The guiding cylinder 60 surrounds the first barrel 10, and includes a barrel guiding groove 62 that guides movement of a guiding protrusion 15 that is formed externally protruding from the first barrel 10. The barrel guiding groove 62 is extended in a longitudinal direction of the guiding cylinder 60 so that the first barrel 10 may move in the longitudinal direction relative to the guiding cylinder 60.

The guiding cylinder 60 includes a cam guiding groove 61 that couples with a cam 45 that externally protrudes from the rotating plate 40 (see also FIG. 3) to guide movement of the cam 45. The cam guiding groove 61 is formed as a curve extending in a circular direction of the guiding cylinder 60 from a front position 61a to a rear position 61c. Therefore, as the cam 45 of the rotating plate 40 moves along the cam guiding groove 61, the rotating plate 40 may rotate around the optical axis L in the guiding cylinder 60.

The rotating plate 40 includes a through hole 41 that corresponds to the optical axis L, is rotatably disposed in front of the first barrel 10, and then functions to transform rotational movement generated via the cam guiding groove 61 of the guiding cylinder 60 into linear movement of the first ray shielding plate 31. External incident image light of an object may enter into the first barrel 10 via the through hole 41 of the rotating plate 40. In order to transform rotational movement into linear movement, the rotating plate 40 includes a long hole 42 that is coupled with a first coupling protrusion 31a of the first ray shielding plate 31.

The rotating plate 40 is elastically supported by a spring 44, that is, an elastic member, and is disposed in front of the first barrel 10. Instead of the spring 44, the elastic member may be a rubber, a sponge, a compressible air cylinder or the like.

The first movement guiding plate 52 is disposed in front of the rotating plate 40, and the first ray shielding plate 31 is disposed in front of the first movement guiding plate 52. A through hole 52c that transmits the image light is formed in a center of the first movement guiding plate 52. The first ray shielding plate 31 includes a first coupling protrusion 31a that protrudes toward the rotating plate 40. The first coupling protrusion 31a passes through a guide hole 52a of the first movement guiding plate 52, and is coupled with the long hole 42 of the rotating plate 40. Therefore, when the rotating plate 40 rotates, a rotational force is delivered to the first coupling protrusion 31a that is coupled with the long hole 42.

A groove 52b that guides linear movement of the first ray shielding plate 31 is formed having a linear shape extending in a direction on a surface of the first movement guiding plate 52 that faces the first ray shielding plate 31. A protrusion 31b is formed on the first ray shielding plate 31 so as to be coupled with the groove 52b. Movement of the protrusion 31b is restricted by the groove 52b while the first ray shielding plate 31 is coupled with the first movement guiding plate 52, and thus, when the rotational force of the rotating plate 40 is delivered to the first coupling protrusion 31a, the first ray shielding plate 31 linearly moves in the direction that the groove 52b extends in.

The second ray shielding plate 32 is disposed in front of the first ray shielding plate 31. While the first ray shielding plate 31 is disposed to be movable in the Z-axis dimension in FIG. 3, the second ray shielding plate 32 is disposed to be movable in the Y-axis dimension in FIG. 3. The first ray shielding plate 31 includes a second coupling protrusion 31c on a surface facing the second ray shielding plate 32. The second ray shielding plate 32 includes a guide hole 32b to be coupled with the second coupling protrusion 31c of the first ray shielding plate 31. Thus, namely, the first ray shielding plate 31 moves the second ray shielding plate 32 via the second protrusion 31c of the first ray shielding plate 31 coupled to the guide hole 32b of the second ray shielding plate 32.

The second movement guiding 51 is disposed in front of the second ray shielding plate 32. The second movement guiding plate 51 includes a through hole 51c formed in a center so as to transmit the image light, and a long hole 51a. The long hole 51a functions to guide movement of the first ray shielding plate 31 by supporting the second coupling protrusion 31c of the first ray shielding plate 31, wherein the second coupling protrusion 31c passes through the guide hole 32b of the second ray shielding plate 32.

The second ray shielding plate 32 includes a protrusion 32a that protrudes toward the second movement guiding plate 51. A groove 51b for guiding linear movement of the second ray shielding plate 32 is formed to extend while having a linear shape on a surface of the second movement guiding plate 51 that faces the second ray shielding plate 32.

While the second movement guiding plate 51 is coupled with the second ray shielding plate 32, the protrusion 32a is coupled to the groove 51b so that movement of the protrusion 32a is restricted by the groove 51b, and thus, when the rotational force of the rotating plate 40 is delivered to the second coupling protrusion 31c, the second ray shielding plate 32 linearly moves in the direction in which the groove 51b extends. Referring to FIG. 3, the groove 51b of the second movement guiding plate 51 extends in a direction that crosses the direction (a vertical direction in FIG. 3) in which the groove 52b of the first movement guiding plate 52 extends.

A support point 55d is arranged on a front surface of the second movement guiding plate 51. The second coupling protrusion 31c protrudes to the front surface via the long hole 51a and is elastically connected to the support point 55d by having springs 55 interposed therebetween. Therefore, the first ray shielding plate 31 may be elastically supported by the springs 55.

The second movement guiding plate 51 functions as a cover. An insertion groove 51d is formed at an edge of the second movement guiding plate 51, and a fixed protrusion 52d is formed at an edge of the first movement guiding plate 52 so as to correspond to the insertion groove 51d. Therefore, the insertion groove 51d and the fixed protrusion 52d are coupled to each other so that the first movement guiding plate 52 and the second movement guiding plate 51 may remain in a stable coupling state. Accordingly, the first ray shielding plate 31 and the second ray shielding plate 32 disposed between the first movement guiding plate 52 and the second movement guiding plate 51 may stably remain movable.

Figure 7:
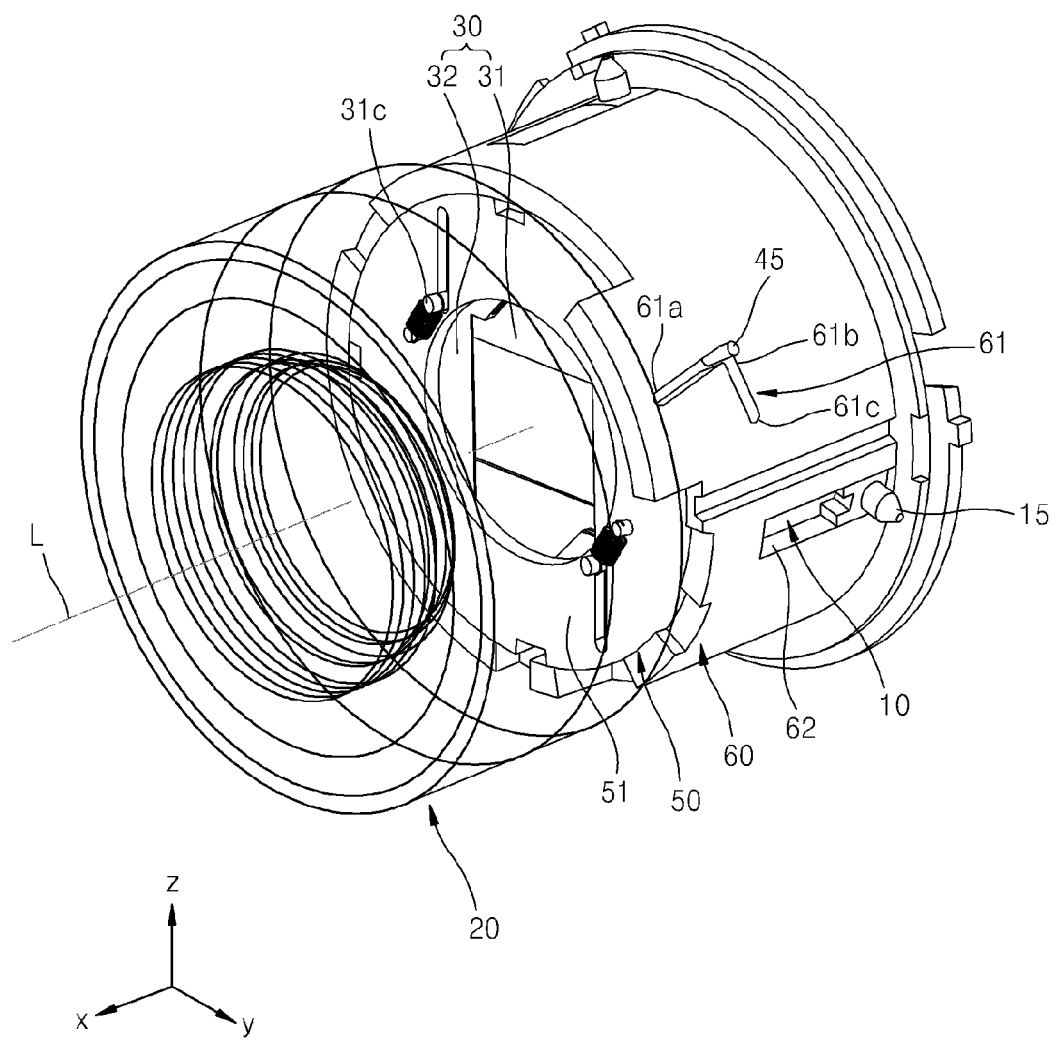
FIG. 7 is a diagram for illustrating a zoom operation of the zoom lens assembly of FIG. 1.

FIG. 7 is a diagram for illustrating a zoom operation of the zoom lens assembly of FIG. 1.

In FIG. 7, the zoom lens assembly operates in a telephoto angle position. The cam 45 of the rotating plate 40 of the shielding assembly 50 is positioned at a middle portion 61b of the cam guiding groove 61. At this time, the ray shielding plate 30 moves by a predetermined distance toward the optical axis L, and thus is narrowed. Therefore, it is possible to effectively block harmful rays that may enter into the first barrel 10 when the distance between the second barrel 20 and the first barrel 10 becomes large.

When the zoom lens assembly operates in a wide angle position, the first barrel 10 moves forward (in the X-axis dimension) to be close to the second barrel 20 from the state illustrated in FIG. 7. The guiding protrusion 15 of the first barrel 10 moves along the barrel guiding groove 62 of the guiding cylinder 60. Since the cam 45 of the rotating plate 40 of the shielding assembly 50 is engaged with the cam guiding groove 61, when the first barrel 10 moves toward the second barrel 20, the cam 45 also moves toward the front position 61a along the cam guiding groove 61. By doing so, the rotating plate 40 rotates, and the first ray shielding plate 31 and the second ray shielding plate 32 move by a predetermined distance so as to be distant from the optical axis L so that it is possible to effectively block harmful rays at the wide angle position.

When the zoom lens assembly does not operate, that is, when power is cut off from a camera apparatus having the zoom lens assembly mounted therein, the second barrel 20 completely moves to be closest to the first barrel 10 so that the second barrel 20 is in the housed state.

FIG. 2 corresponds to the housed state caused by cutting off the power. In the housed status, the first barrel 10 moves backward (in the X-axis dimension) along the guiding cylinder 60, and the second barrel 20 moves toward the first barrel 10. Since a back surface of the second barrel 20 presses the second movement guiding plate 51 in a direction toward the first barrel 10, the shielding assembly 50 is positioned to be closest to the first barrel 10.

In this manner, the shielding assembly 50 is pressed by the second barrel 20 so that the shielding assembly 50 is housed in a space between the first barrel 10 and the second barrel 20. By doing so, it is possible to adjust the positions of the ray shielding plates 30 for blocking harmful rays according to an operational state of the zoom lens assembly, without increasing a total length of the zoom lens assembly.

As described above, although relative positions of lenses are adjusted to perform a zoom function, a position of the ray shielding plates in the zoom lens assembly according to the embodiments moves to be close to the optical axis or to be distant from the optical axis according to movement of the first and second barrels, so that it is possible to effectively block the external incident harmful rays.

In addition, when the zoom lens assembly is not used and thus the zoom lens assembly is in the housed state, components for operating the ray shielding plates are housed in the space between the first barrel and the second barrel so that the total length of the zoom lens assembly is not increased, and the zoom lens assembly has a compact structure.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A zoom lens assembly comprising:
a first barrel comprising a first lens group;
a second barrel comprising a second lens group that is aligned with respect to an optical axis of the first lens group, the second barrel disposed in front of the first lens group so as to be position-adjustable along the optical axis with respect to the first barrel;
a first ray shielding plate disposed in front of the first barrel and between the first barrel and the second barrel, and whose position is varied to be close to a center of the optical axis or to be distant from the center of the optical axis so as to block a portion of incident light that enters into the first barrel according to relative positions of the first barrel and the second barrel; and
a rotating plate comprising a through hole corresponding to the optical axis, the rotating plate disposed in front of the first barrel so as to rotate around the optical axis, and comprising a long hole coupled with a first coupling protrusion of the first ray shielding plate so as to transform rotational movement of the rotating plate into linear movement of the first ray shielding plate.

2. The zoom lens assembly of claim 1, further comprising:
a guiding cylinder having a cylindrical shape and surrounding the first barrel, the guiding cylinder comprising:
a barrel guiding groove coupled with a guiding protrusion externally protruding from the first barrel, the barrel guiding groove guiding movement of the guiding protrusion, and
a cam guiding groove coupled with a cam externally protruding from the rotating plate, the cam guiding groove guiding rotation of the rotating plate.

3. The zoom lens assembly of claim 2, wherein the barrel guiding groove extends in a longitudinal direction of the guiding cylinder.

4. The zoom lens assembly of claim 3, wherein the cam guiding groove is formed as a curve extending in a circular direction of the guiding cylinder.

5. The zoom lens assembly of claim 4, further comprising an elastic member disposed between the rotating plate and a front surface of the first barrel and that elastically supports the rotating plate with respect to the first barrel,
wherein a rear surface of the second barrel presses a second movement guiding plate in a direction toward the first barrel.

6. The zoom lens assembly of claim 5, further comprising a first movement guiding plate disposed between the rotating plate and the first ray shielding plate so as to guide the linear movement of the first ray shielding plate.

7. The zoom lens assembly of claim 6, wherein the first movement guiding plate comprises a groove that linearly extends, and the first ray shielding plate comprises a protrusion that is coupled with the groove of the first movement guiding plate.

8. The zoom lens assembly of claim 7, further comprising a second ray shielding plate comprising a long hole to which a second coupling protrusion protruding from a front surface of the first ray shielding plate is inserted, the second ray shielding plate disposed in front of the first ray shielding plate, wherein the second movement guiding plate is disposed in front of the second ray shielding plate so as to guide linear movement of the second ray shielding plate.

9. The zoom lens assembly of claim 8, wherein the second movement guiding plate comprises a groove that linearly extends, and the second ray shielding plate comprises a protrusion that is coupled with the groove of the second movement guiding plate.

10. The zoom lens assembly of claim 9, wherein the groove of the second movement guiding plate is extended in a direction crossing a direction in which the groove of the first movement guiding plate is extended.

* * * * *